United States Patent
Anchi et al.

(10) Patent No.: US 11,093,144 B1
(45) Date of Patent: Aug. 17, 2021

(54) NON-DISRUPTIVE TRANSFORMATION OF A LOGICAL STORAGE DEVICE FROM A FIRST ACCESS PROTOCOL TO A SECOND ACCESS PROTOCOL

(71) Applicant: EMC IP Holding Company LLC, Hopkinton, MA (US)

(72) Inventors: Amit Pundalik Anchi, Bangalore (IN); Sanjib Mallick, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/793,262

(22) Filed: Feb. 18, 2020

(51) Int. Cl.
*G06F 13/00* (2006.01)
*G06F 3/06* (2006.01)
*G06F 9/50* (2006.01)

(52) U.S. Cl.
CPC .......... *G06F 3/0622* (2013.01); *G06F 3/0635* (2013.01); *G06F 3/0679* (2013.01); *G06F 9/5016* (2013.01); *G06F 2209/5011* (2013.01)

(58) Field of Classification Search
CPC .... G06F 3/0622; G06F 9/5016; G06F 3/0679; G06F 3/0635; G06F 2209/5011
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Jing-Yih Shyu
(74) *Attorney, Agent, or Firm* — Ryan, Mason & Lewis, LLP (57) ABSTRACT

A host device discovers one or more first protocol endpoints presented by a storage system for a first logical storage device utilizing a first access protocol, and discovers one or more second protocol endpoints presented by the storage system for a second logical storage device utilizing a second access protocol. Responsive to determining that the first and second logical storage devices have a same device identity, the host device temporarily masks the one or more second protocol endpoints in a multi-path layer of the host device from one or more applications executing on the host device. In conjunction with a switchover from the first logical storage device to the second logical storage device, the host device ends the temporary masking in the multi-path layer and enables access of the one or more applications to the second logical storage device via the one or more second protocol endpoints.

20 Claims, 3 Drawing Sheets

(56) References Cited

U.S. PATENT DOCUMENTS

| | | |
|---|---|---|
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,327,102 B1 * | 12/2012 | Palsule ................. G06F 3/0617 711/165 |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,400,611 B1 | 7/2016 | Raizen |
| 9,594,780 B1 | 3/2017 | Esposito et al. |
| 9,647,933 B1 | 5/2017 | Tawri et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,639 B2 | 12/2019 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0117766 A1 | 5/2013 | Bax et al. |
| 2014/0105068 A1 | 4/2014 | Xu |
| 2014/0281306 A1 * | 9/2014 | Nakajima ............. G06F 3/0683 711/162 |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0114278 A1 * | 4/2019 | Olarig ................. G06F 13/4022 |
| 2020/0043565 A1 * | 2/2020 | Yun ..................... G06F 11/2221 |
| 2020/0089424 A1 * | 3/2020 | Klein ..................... G11C 29/52 |
| 2020/0106698 A1 * | 4/2020 | Rao ......................... H04L 45/24 |
| 2020/0225863 A1 * | 7/2020 | Veluswamy ............. G06F 3/061 |
| 2020/0314218 A1 * | 10/2020 | Kumar ..................... H04L 69/08 |
| 2020/0401346 A1 * | 12/2020 | Shimada ............... G06F 3/0688 |

FOREIGN PATENT DOCUMENTS

| | | | |
|---|---|---|---|
| EP | 2667569 A1 | 11/2013 | |
| GB | 2465815 A * | 6/2010 | ........... G06F 3/0664 |
| WO | PCT/US2019/052549 | 12/2019 | |
| WO | PCT/US2019/053204 | 12/2019 | |
| WO | PCT/US2019/053473 | 12/2019 | |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

U.S. Appl. No. 15/795,653 filed in the name of Maneesh Pusalkar et al. filed Oct. 27, 2017, and entitled "Storage System with Network-Wide Configurable Device Names."

U.S. Appl. No. 16/142,274 filed in the name of Sanjib Mallick et al. filed Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. filed Sep. 28, 2018, and entitled "Host Device with Multi-Path Layer Implementing Path Selection Based at Least in Part on Fabric Identifiers."

U.S. Appl. No. 16/155,491 filed in the name of Kundan Kumar et al. filed Oct. 9, 2018, and entitled "Migrating Control of a Multi-Path Logical Device from a Current MPIO Driver to a Target MPIO Driver."

U.S. Appl. No. 16/155,429 filed in the name of Rimpesh Patel et al. filed Oct. 9, 2018, and entitled "Categorizing Host IO Load Pattern and Communicating Categorization to Storage System."

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

\* cited by examiner

NON-DISRUPTIVE TRANSFORMATION OF A LOGICAL STORAGE DEVICE FROM A FIRST ACCESS PROTOCOL TO A SECOND ACCESS PROTOCOL

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (TO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols. Although there are techniques available to migrate data between two different logical storage devices using respective different access protocols, such techniques fail to provide an effective mechanism for transforming a particular logical storage device from utilization of a first access protocol such as a SCSI access protocol to utilization of a second access protocol such as an NVMe access protocol, without unduly disrupting the operation of the storage system.

SUMMARY

Illustrative embodiments provide non-disruptive transformation of logical storage devices between different access protocols. For example, such embodiments can alter, in a non-disruptive manner, the particular access protocol through which a given logical storage volume or other logical storage device is accessed by a host device, illustratively from a SCSI access protocol to an NVMe access protocol or vice versa.

In some embodiments, the non-disruptive transformation of storage device access protocol is implemented in a multi-path layer that comprises at least one multi-path input-output (MPIO) driver configured to process IO operations of at least one host device that communicates with one or more storage arrays or other types of storage systems.

For example, in some embodiments, a multi-path layer that supports multiple access protocols such as SCSI and NVMe is configured to manage a particular logical storage device so as to provide different sets of paths for both SCSI and NVMe access protocols but with a single device identity, illustratively by presenting a corresponding "pseudo device" or other type of composite device having a single device identity to one or more upper layers of the host device. This allows the multi-path layer to non-disruptively transform the particular logical storage device from SCSI to NVMe or vice versa. As the device identity is persistent across this transformation, applications executing on the host device see no impact and the host device can non-disruptively switch the particular logical storage device from utilization of one access protocol to utilization of the other access protocol.

Advantageously, illustrative embodiments can substantially reduce or eliminate any disruption to the host device or storage system in transitioning logical storage devices between different access protocols.

In one embodiment, an apparatus comprises a host device configured to communicate over a network with a storage system. The host device discovers one or more first protocol endpoints presented by the storage system for a first logical storage device, the first logical storage device utilizing a first access protocol, and discovers one or more second protocol endpoints presented by the storage system for a second logical storage device, the second logical storage device utilizing a second access protocol different than the first access protocol. Responsive to determining that the first and second logical storage devices have a same device identity, the host device temporarily masks the one or more second protocol endpoints in a multi-path layer of the host device from one or more applications executing on the host device. In conjunction with a switchover from the first logical storage device to the second logical storage device, the host device ends the temporary masking in the multi-path layer and enables access of the one or more applications to the second logical storage device via the one or more second protocol endpoints.

The multi-path layer in some embodiments comprises one or more MPIO drivers each configured to control delivery of IO operations from the host device to the storage system over selected paths through the network. Different MPIO drivers of the multi-path layer may be provided by different host devices that share the storage system.

In some embodiments, responsive to determining that the first and second logical storage devices have a same device identity, the multi-path layer merges the first and second logical storage devices into a single pseudo device for presentation to the one or more applications executing on the host device.

The storage system illustratively configures the first and second logical storage devices to have the same identity but to utilize different access protocols. For example, the first logical storage device may be configured by the storage system as a SCSI storage device, and the second logical storage device may be configured by the storage system as an NVMe storage device having the same device identity as the first logical storage device and a storage capacity at least equal to that of the first logical storage device.

In some embodiments, the first and second logical storage devices are part of a same storage pool of a storage array of the storage system. Alternatively, the first and second logical storage devices may be part of respective first and second different storage pools of at least one storage array of the storage system, or part of respective first and second different storage pools of respective first and second storage arrays of the storage system. For some embodiments in which the first and second logical storage devices are not part of the same storage pool, prior to initiation of the switchover from the first logical storage device to the second logical storage device, data is copied from the first logical storage device in the first storage pool to the second logical storage device in the second storage pool, illustratively in an activated migration session of a host-based or storage-based automated seamless migration process.

In conjunction with discovering one or more first protocol endpoints and one or more second protocol endpoints, the host device in some embodiments is further configured to determine a first set of paths for accessing the first logical storage device via the one or more first protocol endpoints, and to determine a second set of paths for accessing the second logical storage device via the one or more second protocol endpoints. The first and second sets of paths may be managed by the multi-path layer utilizing respective first and second class objects implemented as respective first and second loadable array modules.

The temporary masking of the one or more second protocol endpoints in the multi-path layer of the host device from the one or more applications executing on the host device in some embodiments comprises interrupting a process for publishing the one or more second protocol endpoints from the multi-path layer to at least a portion of at least one host device layer above the multi-path layer. In such an embodiment, ending the temporary masking in the multi-path layer illustratively comprises performing the process for publishing the one or more second protocol endpoints from the multi-path layer to the at least a portion of the at least one host device layer above the multi-path layer.

Some embodiments include one or more additional host devices each configured to communicate over the network with the storage system, with each of the host devices executing a separate switchover from the first logical storage device utilizing the first access protocol to the second logical storage device utilizing the second access protocol.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
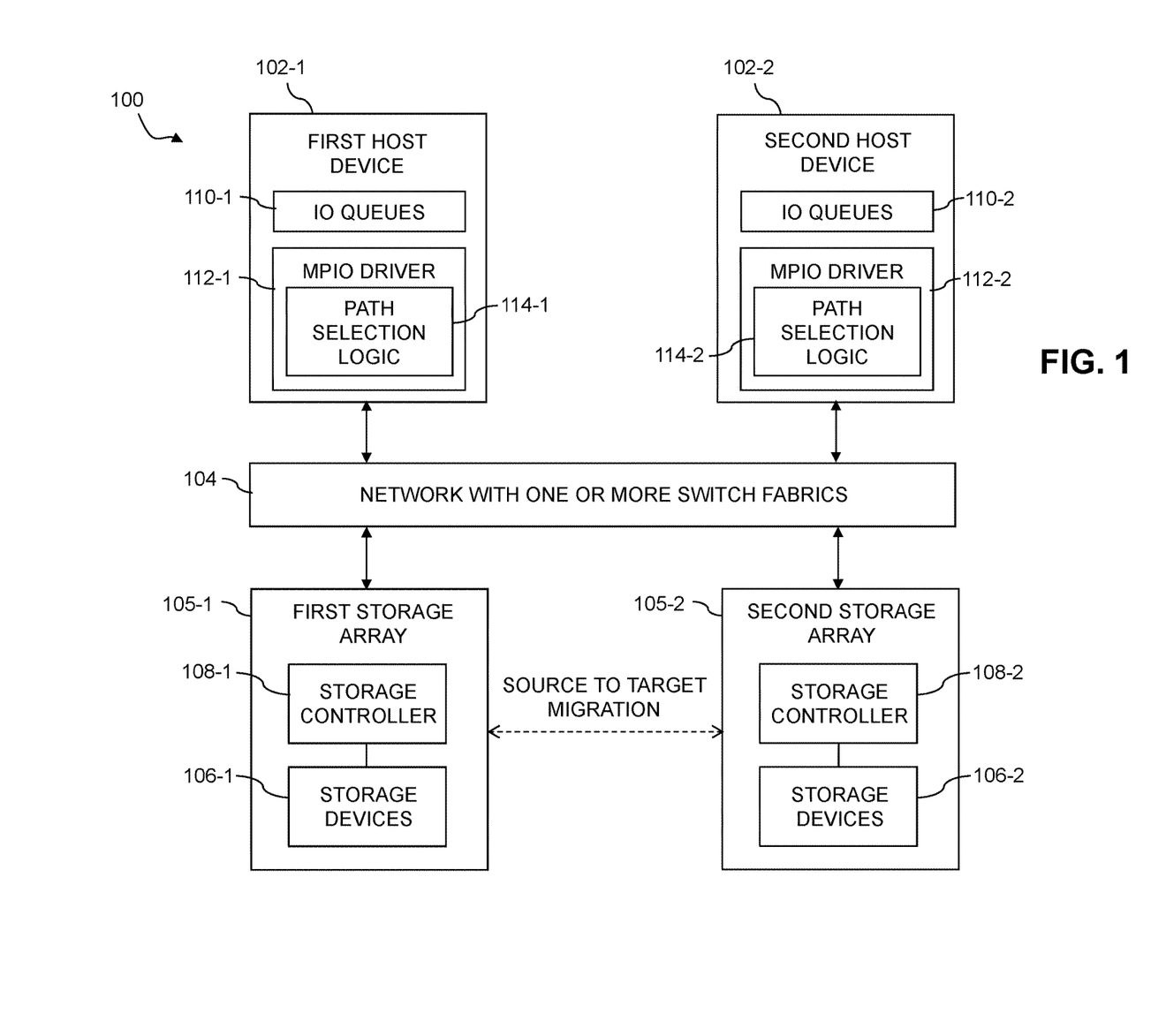
FIG. 1 is a block diagram of an information processing system configured with functionality for non-disruptive transformation of logical storage devices across access protocols utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for migration between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

In some embodiments, the multi-path layer additionally supports what is referred to herein as "non-disruptive transformation across access protocols" for logical storage devices of the storage arrays 105. Such non-disruptive transformation functionality may be implemented at least in part in the multi-path layer, and may additionally or alternatively be implemented at least part in migration control logic of the host devices 102 and storage arrays 105.

The MPIO drivers 112 may comprise, for example, otherwise conventional MPIO drivers, such as PowerPath® drivers from Dell EMC, suitably modified in the manner disclosed herein to support non-disruptive transformation across access protocols. Other types of MPIO drivers from other driver vendors may be suitably modified to incorporate functionality for non-disruptive transformation as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers. These and other references to Power-Path® herein are presented by way of illustrative example only, and should not be construed as limiting in any way.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also configured to implement at least portions of non-disruptive transformation functionality of host device 102-1. Other host device components, such as migration control logic implemented in one or more host device processors, can additionally or alternatively implement aspects of the non-disruptive transformation functionality of the host device 102-1. The disclosed embodiments are therefore not limited to embodiments in which non-disruptive transformation functionality is controlled at least in part by an MPIO driver or multi-path layer.

As indicated previously, although there are techniques available to migrate data between two different logical storage devices using respective different access protocols, such techniques fail to provide an effective mechanism for transforming a particular logical storage device from utilization of a first access protocol such as a SCSI access protocol to utilization of a second access protocol such as an NVMe access protocol, possibly within a single storage array, without unduly disrupting the operation of the storage system.

For example, in certain systems, such as those using VMware® ESXi servers, detection of an identity change for a given logical storage device of a storage system causes the changed device to be marked as a copy of the original device by the ESXi server that detected the condition. This marking as a copy makes the new device unusable for many operations, thereby causing undesirable disruptions of the type noted above, including disruptions in one or more host applications that utilize the logical storage device.

Illustrative embodiments herein provide non-disruptive transformation of logical storage devices between different access protocols. For example, such embodiments can alter, in a non-disruptive manner, the particular access protocol through which a given logical storage volume or other logical storage device is accessed by a host device, illustratively from a SCSI access protocol to an NVMe access protocol or vice versa.

Such functionality is provided at least in part utilizing a multi-path layer comprising one or more MPIO drivers 112 that each support both the SCSI access protocol and the NVMe access protocol. The multi-path layer is configured to manage a particular logical storage device so as to provide different sets of paths for both SCSI and NVMe access protocols but with a single device identity, illustratively by presenting a corresponding "pseudo device" or other type of composite device having a single device identity to one or more upper layers of the host device. This allows the multi-path layer to non-disruptively transform the particular logical storage device from SCSI to NVMe or vice versa. As the device identity is persistent across this transformation, applications executing on the host device see no impact and the host device can non-disruptively switch the particular logical storage device from utilization of one access protocol to utilization of the other access protocol.

In accordance with the non-disruptive transformation functionality, the host device 102-1 is configured to discover one or more first protocol endpoints presented by at least one of the storage arrays 105 for a first logical storage device, the first logical storage device utilizing a first access protocol, and to discover one or more second protocol endpoints presented by at least one of the storage arrays 105 for a second logical storage device, the second logical storage device utilizing a second access protocol different than the first access protocol.

The term "protocol endpoint" as used herein is intended to be broadly construed, so as to generally encompass a wide variety of different types of devices of at least one of the storage arrays 105 that are associated with a particular access protocol by the at least one storage array and discoverable by one or more of the host devices 102. For example, in some embodiments, a given protocol endpoint can comprise a single block storage device that is not utilizable for storage. Other examples of protocol endpoints include network file system (NFS) mount points and proxy LUNs. Different types of protocol endpoints can be presented by the at least one storage array for different access protocols.

It is assumed in some embodiments that the first and second logical storage devices were previously configured by at least one of the storage arrays 105 to utilize the respective first and second access protocols, and also to have the same device identity. The fact the first and second logical storage devices have been assigned the same device identity by at least one of the storage arrays 105 is further assumed to be detectable by the host device 102-1, illustratively via the multi-path layer comprising MPIO driver 112-1.

Responsive to determining that the first and second logical storage devices have the same device identity, the host device 102-1 is further configured to temporarily mask the one or more second protocol endpoints in the multi-path layer of the host device 102-1 from one or more applications executing on the host device 102-1.

In conjunction with a switchover from the first logical storage device to the second logical storage device, the host device 102-1 is further configured to end the temporary masking in the multi-path layer and to enable access of the one or more applications to the second logical storage device via the one or more second protocol endpoints.

The MPIO driver 112-1 illustratively maintains separate device identities for the first and second logical storage devices, while presenting a corresponding pseudo device or other type of composite device having a single device identity to one or more upper layers of the host device 102-1. For example, responsive to determining that the first and second logical storage devices have the same device identity, the MPIO driver 112-1 illustratively merges the first and second logical storage devices into a single pseudo device for presentation to the one or more applications executing on the host device 102-1. Such arrangements allow the MPIO driver 112-1 to subsequently switch from utilization of the first logical storage device to utilization of the second logical storage device, in a manner that avoids any disruption to the one or more applications executing on the host device 102-1.

The one or more upper layers of the host device illustratively include one or more host device processor layers, upper operating system layers and/or application layers of the host device, which are implemented at least in part above the multi-path layer in a layered architecture of the host device 102-1. The term "multi-path layer" as used herein is intended to be broadly construed, and may be implemented, for example, as an MPIO layer comprising one or more MPIO drivers such as MPIO driver 112-1. Other types of multi-path layers can be implemented using other types of multi-pathing components of a host device.

In some embodiments, in conjunction with discovering one or more first protocol endpoints and one or more second protocol endpoints, the host device 102-1 is further configured to determine a first set of paths for accessing the first logical storage device via the one or more first protocol endpoints, and to determine a second set of paths for accessing the second logical storage device via the one or more second protocol endpoints. The first and second sets of paths are illustratively managed by the multi-path layer comprising MPIO driver 112-1 utilizing respective first and second class objects implemented as respective first and second loadable array modules (LAMs).

The temporary masking of the one or more second protocol endpoints in the multi-path layer of the host device 102-1 from one or more applications executing on the host device 102-1 illustratively comprises interrupting a process for publishing the one or more second protocol endpoints from the multi-path layer to at least a portion of at least one host device layer above the multi-path layer. Similarly, ending the temporary masking in the multi-path layer illustratively comprises performing the process for publishing the one or more second protocol endpoints from the multi-path layer to the at least a portion of the at least one host device layer above the multi-path layer.

In some embodiments, the first access protocol associated with the source logical storage device comprises a SCSI access protocol and the second access protocol associated with the target logical storage device comprises an NVMe access protocol. The SCSI and NVMe protocols utilized in such illustrative embodiments are examples of what are more generally referred to herein as "first and second access protocols." The SCSI and NVMe protocols of the respective source and target logical storage devices may more particularly comprise SCSI-FC and NVMeoFC access protocols, respectively, where FC denotes Fibre Channel, although numerous other types of first and second access protocols can be used in other embodiments.

For example, in some embodiments, the one or more first protocol endpoints presented by at least one of the storage arrays 105 for the first logical storage device are presented via a translation layer of at least one of the storage arrays 105 that translates from a third access protocol to the first access protocol. The first access protocol in a given such embodiment may comprise a SCSI access protocol and the third access protocol may comprise an NVMe over Fabric (NVMeoF) access protocol.

In some embodiments, the first and second logical storage devices are located on respective ones of the first and second storage arrays 105. However, in other embodiments, the first and second logical storage devices are both located on the same storage array. For example, the first and second logical storage devices may be part of the same storage pool implemented in one of the storage arrays 105. Alternatively, the first and second logical storage devices may be part of respective first and second different storage pools of at least one of the storage arrays 105, or part of respective first and second different storage pools of the respective first and second storage arrays 105. The term "storage pool" as used herein is intended to encompass any of a variety of arrangements in which different logical storage devices utilize the same underlying set of physical storage devices of a storage array or other type of storage system, and therefore the logical storage devices can be reconfigured without requiring any copying of data of the underlying set of physical storage devices.

In embodiments in which the first and second logical storage devices are not part of the same storage pool on the same storage array, a migration session is illustratively activated to copy data of the first logical storage device to the second logical storage device, such that upon successful completion of the migration session, the first and second storage devices contain the same data and have reached a synchronized state. Such copying illustratively occurs prior to initiation of the switchover from the first logical storage device to the second logical storage device, but in other embodiments can occur at other times, such as during an initial stage of the switchover. The first and second logical storage devices are also referred to as respective source and target devices in the context of a migration process that involves copying of data from the source device to the target device.

For example, some embodiments utilize a host-based migration process such as PowerPath® Migration Enabler (PPME) to implement the migration session for copying data from the source device to the target device. In one or more such embodiments, PowerPath® drivers and an associated PPME process are modified to support a single logical storage volume or other logical storage device that presents protocol endpoints of two different access protocols, illustratively SCSI and NVMe, and to support device access protocol transformation from SCSI to NVMe and vice versa. The device identity is persistent across this transformation, thereby providing a non-disruptive solution.

Storage-based migration processes such as Non-Destructive Migration (NDM) can be used in some embodiments, but such processes typically require device spoofing. More particularly, these storage-based migration processes typically require the target device to spoof the source device identifier or ID. This device spoofing can pose problems when the source and target devices are not both on the same one of the storage arrays 105, since the target device ID on the target array in some cases does not reflect the actual storage array on which the device resides. For example, if the storage array information is embedded in the device ID, and the target device is spoofing the source device by using the source device ID, the storage array information embedded in the spoofed device ID will indicate the source array and not the target array, even though the target device is located on the target array.

Host-based migration processes such as the above-noted PPME allow the target device to keep its own device ID, as the MPIO driver 112-1 of the multi-path layer can merge the two device IDs into a single device ID for presentation to a host device processor layer, thereby avoiding the problems associated with spoofing.

Once activated, the migration session can be utilized to carry out actual copying of data from the source logical storage device to the target logical storage device. The copying of data is also referred to herein as being performed as part of a migration process. Such a migration process can encompass, for example, the activated migration session in the host device 102-1, and possibly also a corresponding migration session activated in the first and second storage arrays 105, with the storage-side process illustratively configured for storage array based copying of data from the source logical storage device to the target logical storage device in a manner that avoids excessive consumption of host device resources.

The host device 102-1 is further configured to terminate the activated migration session responsive to completion of the copying of the data of the source logical storage device to the target logical storage device. The source logical storage device can be deprecated or repurposed responsive to termination of the activated migration session.

As indicated above, activation of the migration session in the host device 102-1 causes a migration process to be performed in which data is copied from the source logical storage device to the target logical storage device.

The migration process can include, for example, a storage-based migration process in which the first storage array 105-1 controls the copying of the data from the first storage array 105-1 to the second storage array 105-2, illustratively with no significant involvement of the host device 102-1 in the migration process.

As another example, the migration process can include a host-based migration process in which the first storage array 105-1 controls the copying of the data from the first storage array 105-1 to the second storage array 105-2, but with significant involvement of the host device 102-1 in the migration process. For example, the MPIO driver 112-1 of the host device 102-1 can initiate the data copying.

Other types of migration processes involving at least one of the host device 102-1 and the storage arrays 105 can be used in other embodiments.

The host device 102-1 is further configured to obtain, in conjunction with the migration process, an indication from the second storage array 105-2 that the first and second storage arrays 105 have achieved synchronization with respect to the migration of the source logical storage device to the target logical storage device, and to commit to utilization of the target logical storage device responsive to the indication. Once committed to utilizing the target logical storage device, the host device 102-1 no longer utilizes the source logical storage device.

Multiple host devices 102 can be similarly notified that they should commit to the utilization of the target logical storage device, once the first and second storage arrays 105 have achieved synchronization with respect to the migration of the source logical storage device to the target logical storage device.

For example, each of the host devices 102 is illustratively configured to obtain a notification from at least one of the first and second storage arrays 105 directing that the host device move from utilization of the source logical storage device to utilization of the target logical storage device.

After all of the host devices 102 using the source logical storage device have committed in the manner described above to utilization of the target logical storage device, the migration from source to target is considered fully complete, and the source logical storage device can therefore be removed or otherwise deleted from the system 100.

Accordingly, in some embodiments, at least one of the first and second storage arrays 105 will notify all of the host devices 102 that are working with the source logical storage device to instead start working with the target logical storage device. This is illustratively achieved by a given one of the storage arrays 105 issuing a check condition notification or other type of notification at a particular point in time to each of the host devices 102, even if that host device is turned off or in a "sleep" state. Any such host device will address the notification when it is later turned on or "wakes up," such that it will automatically start working with the target logical storage device instead of the source logical storage device.

Such features are examples of what is more generally referred to herein as "automated seamless migration" of logical storage devices. Illustrative embodiments are "automated" in that they can be performed without manual intervention of a host administrator or storage administrator, and are also "seamless" in that each host device seamlessly transitions from usage of the source logical storage device to usage of the target logical storage device at an appropriate time, without the need for any synchronization between multiple host devices. Other automated seamless migration arrangements can be used in other embodiments. However, in some embodiments, such as those in which the source and target logical storage devices subject to non-disruptive transformation are in the same storage pool on the same storage array, automated seamless migration or other types of data copying from a source logical storage device to a target logical storage device may not be needed.

In some embodiments, the source logical storage device comprises a non-paired or "local only" logical device and the target logical storage device comprises a paired logical device. Such a paired logical device is illustratively established in accordance with an active-active configuration of the first and second storage arrays 105, and is identified by the MPIO driver 112-1 as a single logical device but has separate corresponding logical devices on the respective first and second storage arrays. Migration from a non-paired logical device to a paired logical device can be implemented, for example, in order to achieve a high availability arrangement for the data of the migrated logical device, with the migrated logical device being accessible on both of the storage arrays 105. These and numerous alternative data movement scenarios or more generally other types of migration scenarios can used in illustrative embodiments herein.

The above-described functions associated with non-disruptive transformation functionality of the host device 102-1 are illustratively carried out at least in part utilizing the MPIO driver 112-1 and its path selection logic 114-1. For example, in some embodiments, the non-disruptive transformation functionality can be implemented substantially entirely under the control of the MPIO driver 112-1, and in such embodiments the MPIO driver 112-1 is illustratively configured to control performance of certain steps of the flow diagram to be described below in conjunction with FIG. 2. Additional or alternative host device components, such as migration control logic implemented in the host device, can be used to control performance of a non-disruptive transformation process such as that of FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed non-disruptive transformation functionality. Accordingly, aspects of non-disruptive transformation functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support non-disruptive transformation across access protocols.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the non-disruptive transformation functionality.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising one or more host devices and at least one storage system. For example, the process can be implemented using first and second storage systems comprising respective first and second storage arrays, possibly but not necessarily arranged in an active-active configuration, with each storage array comprising a plurality of storage devices. The storage devices of the first and second storage arrays are assumed to include logical storage volumes or other types of logical storage devices. Alternatively, the process can be implemented using a single storage array or other storage system also comprising logical storage devices. The logical storage devices of one or more storage systems are referred to in the following description as simply "devices."

Figure 2:
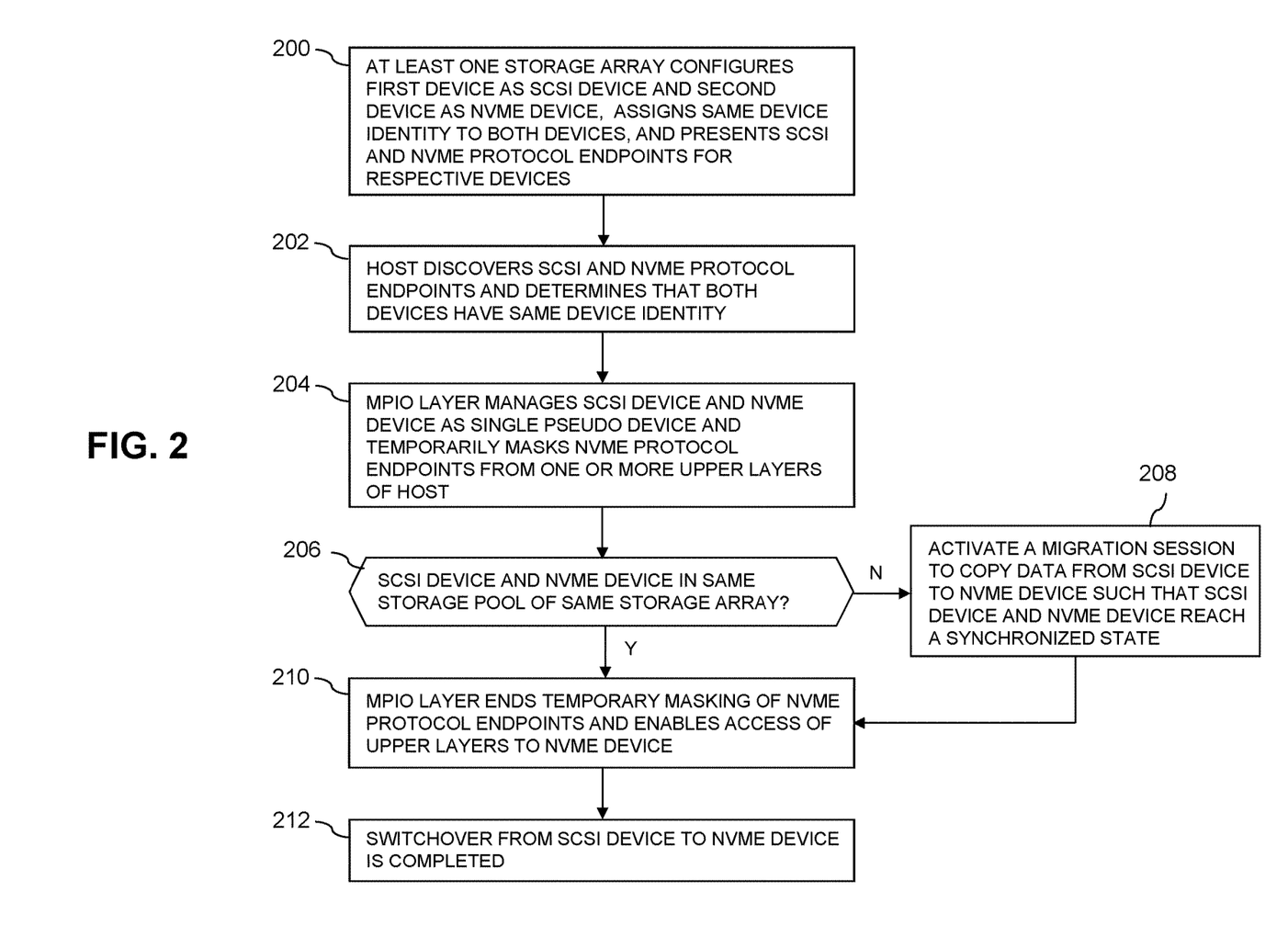
FIG. 2 is a flow diagram of a process for non-disruptive transformation of logical storage devices across access protocols utilizing a multi-path layer of a host device in an illustrative embodiment.

Certain steps of the FIG. 2 process are illustratively performed primarily by or under the control of an MPIO layer of a given host device, such as the MPIO driver 112-1 of the first host device 102-1 of system 100, although other arrangements of system components can perform at least portions of one or more of the steps in other embodiments. The functionality of the FIG. 2 process is illustratively performed at least in part in conjunction with a load balancing algorithm or other type of path selection algorithm executed by the path selection logic 114-1 of the MPIO driver 112-1.

In step 200, at least one storage array configures a first device as a SCSI device and a second device as an NVMe device, assigns the same device identity to both the SCSI device and the NVMe device, presents one or more SCSI protocol endpoints for the SCSI device, and presents one or more NVMe protocol endpoints for the NVMe device. The two devices can be in the same storage array, or in respective first and second storage arrays. The SCSI device is accessible via a SCSI protocol, and the NVMe device is accessible via an NVMe protocol. Presentation of SCSI or NVMe protocol endpoints as that term is broadly used herein is intended to encompass various arrangements through which the storage array makes the corresponding protocol endpoints discoverable by one or more host devices.

The SCSI and NVMe protocols utilized in the present embodiment are examples of what are more generally referred to herein as "first and second access protocols." The SCSI and NVMe protocols may more particularly comprise, for example, SCSI-FC and NVMeoFC access protocols, respectively, although numerous other types of first and second access protocols can be used in other embodiments.

In step 202, the host device discovers the SCSI and NVMe protocol endpoints and determines that both devices have the same device identity.

In step 204, the MPIO layer of the host device manages the SCSI device and the NVMe device as a single pseudo device, and temporarily masks the NVMe protocol endpoints from one or more upper layers of the host device, such as one or more application execution layers of the host device. The MPIO layer illustratively provides different sets of paths for the SCSI device and the NVMe device but with a single device identity corresponding to the pseudo device. This allows the MPIO layer to non-disruptively transform the pseudo device from utilization of the SCSI protocol to utilization of the NVMe protocol.

In step 206, a determination is made as to whether or not the SCSI device and the NVMe device are in the same storage pool of the same storage array. Such a determination is illustratively made by the MPIO layer of the host device. If the SCSI device and the NVMe device are not in the same storage pool of the same storage array, the process moves to step 208, and otherwise proceeds directly to step 210 as shown.

In step 208, which is reached if the SCSI device and the NVMe device are not part of the same storage pool in the same storage array, the host device activates a migration session to copy data from the SCSI device to the NVMe device such that the SCSI device and the NVMe device eventually reach a synchronized state in which each device contains the same data. The migration session can comprise, for example, a host-based migration session carried out primarily by the host device, or a storage-based migration session, possibly initiated by the host device, but carried out primarily by the storage arrays. Once the SCSI device and NVMe device have reached a synchronized state as a result of successful completion of the migration session, the process moves to step 210 as indicated in the figure. If the SCSI device and the NVMe device are part of the same storage pool in the same storage array, step 208 is bypassed, and the process moves directly from step 206 to step 210 as indicated in the figure.

In step 210, the MPIO layer ends the temporary masking of the NVMe protocol endpoints and enables access of the one or more upper layers of the host device to the NVMe device. These operations are illustratively part of an orchestrated switchover from the SCSI device to the NVMe device within the host device. As the pseudo device identity managed by the MPIO layer is persistent across this transformation, applications executing on the host device see no impact and the host device can non-disruptively switch from utilization of the SCSI protocol to utilization of the NVMe protocol. As indicated previously, examples of upper layers of the host device illustratively include one or more host device processor layers, upper operating system layers and/ or application layers of the host device.

In step 212, the switchover from the SCSI device to the NVMe device is completed such that the applications executing on the host device utilize the NVMe device instead of the SCSI device. The host device in conjunction with the switchover therefore commits to the NVMe device, and once the host device has committed to the NVMe device, it will no longer utilize the SCSI device. The SCSI device is illustratively deprecated or repurposed responsive to completion of the switchover, assuming there are no other host devices that are still utilizing that SCSI device. Any such other host devices can similarly commit to usage of the NVMe device in place of the SCSI device.

Although not explicitly indicated in the figure, the process at this point can return to step 200 to carry out one or more additional non-disruptive transformation processes for respective other devices.

The steps of the FIG. 2 process are shown in sequential order for clarity and simplicity of illustration only, and certain steps can at least partially overlap with other steps. Also, one or more of the steps referred to as being performed by a particular system component, such as an MPIO layer, can in other embodiments be performed at least in part by one or more other system components.

As indicated above, different instances of the FIG. 2 process can execute at least in part in parallel with one another for different devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and non-disruptive transformation functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different non-disruptive transformation arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
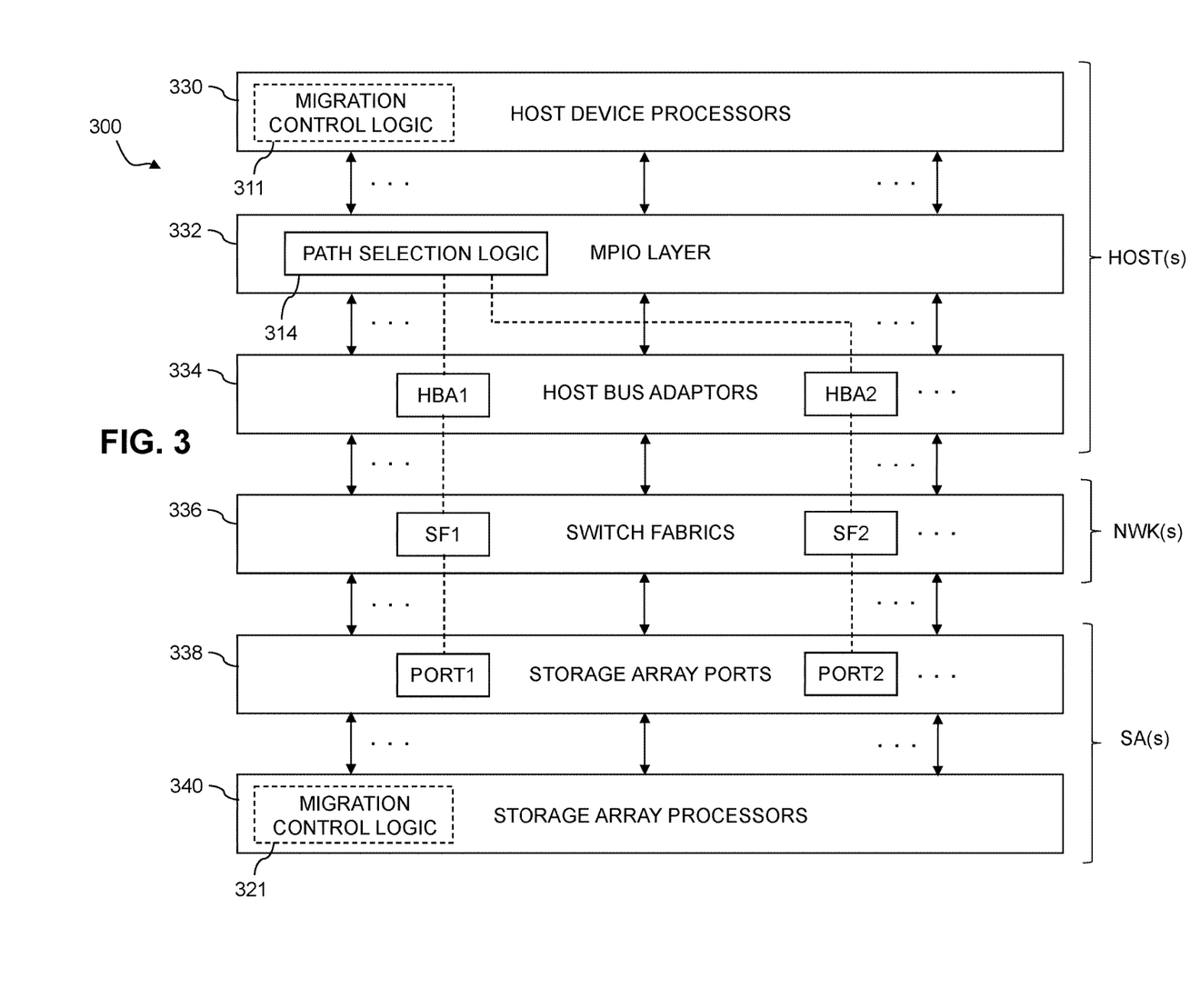
FIG. 3 is a block diagram showing multiple layers of a layered system architecture that includes a multi-path layer with functionality for non-disruptive transformation of logical storage devices across access protocols in an illustrative embodiment.

Referring now to FIG. 3, another illustrative embodiment is shown. In this embodiment, an information processing system 300 comprises host-side migration control logic 311, path selection logic 314 and storage-side migration control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements non-disruptive transformation of logical storage volumes or other logical storage devices across multiple access protocols. The logical storage devices store data for one or more application processes running in one or more host device processors of the host device processor layer 330. The non-disruptive transformation functionality in this embodiment is assumed to be controlled at least in part by host-side migration control logic 311, path selection logic 314 of the MPIO layer 332, and storage-side migration control logic 321, although other arrangements are possible.

The host-side migration control logic 311 implemented in the host processor layer 330 controls host-based migration processes of the system 300. The migration control logic 311 can include multiple distinct migration control logic instances for respective ones of a plurality of host devices of the system 300.

The storage-side migration control logic 321 implemented in the storage array processor layer 340 controls storage-based migration processes of the system 300. The migration control logic 321 can include multiple distinct migration control logic instances for respective ones of a plurality of storage arrays of the system 300.

The host-side and storage-side migration control logic 311 and 321 are illustratively configured to implement at least portions of the functionality for non-disruptive transformation of logical storage devices across multiple access protocols as disclosed herein. These components are shown in dashed outline in the figure, as they can be implemented in different locations within the system 300, or in a distributed manner across multiple locations. For example, the host-side migration control logic 311, although illustratively shown as part of the host processor layer 330, can be implemented at least in part in the MPIO layer 332. As another example, the storage-side migration control logic 321, although illustratively shown as part of the storage array processor layer 340, can be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. The path selection logic 314 in some embodiments operates in conjunction with the host-side and storage-side migration control logic 311 and 321 in implementing at least portions of the functionality for non-disruptive transformation of logical storage devices across multiple access protocols as disclosed herein. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300 through their respective instances of migration control logic 311 or 321 provide functionality for non-disruptive transformation across access protocols, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

A detailed example of a non-disruptive transformation process implemented utilizing an MPIO layer such as MPIO layer 332 of the FIG. 3 embodiment will now be described in more detail. This example provides non-disruptive transformation of a first logical storage device utilizing a first access protocol, such as a SCSI access protocol, to a second logical storage device utilizing a second access protocol, such as an NVMe access protocol.

The process in the present example comprises an algorithm performed by one or more host devices and at least one storage array, with the one or more host devices illustratively utilizing their respective MPIO drivers to perform at least portions of the algorithm. The process illustratively includes both storage-side and host-side portions, with each such portion to be described in detail below.

The storage-side portion of the algorithm in the present example more particularly includes the following steps:

1. Assume the storage array already includes a SCSI device DEV_X.

2. Create a corresponding NVMe device DEV_X' of size equal to or greater than that of the SCSI device DEV_X.

3. Copy the device identifier of the SCSI device DEV_X to the NVMe device DEV_X' so that when presented to the host, the two devices will be managed under the same device identity. By using the device identity of the SCSI device DEV_X for the NVMe device DEV_X', host applications using the SCSI device DEV_X will not be adversely impacted or otherwise disrupted by the transformation to NVMe device DEV_X'.

4. Present one or more NVMe protocol endpoints for the NVMe device DEV_X' that are discoverable by the host. As described below in conjunction with the host-side portion of the algorithm, the host multi-path layer will orchestrate the transformation from SCSI device DEV_X to the NVMe device DEV_X' by restricting device access through the one or more NVMe device endpoints. Restrictions can include, for example, not publishing the one or more NVMe protocol endpoints above the multi-path layer during the transformation, but other kinds of restrictions can be used in this and other embodiments. The host multi-path layer would continue to provide access to the underlying SCSI device DEV_X through one or more existing SCSI protocol endpoints previously discovered by the host.

5. In embodiments in which the storage array maintains different storage pools for SCSI and NVMe, perform data copy from the SCSI device DEV_X to the NVMe device DEV_X' using an internal migration mechanism within the storage array if available or another type of migration facilitated by the host multi-path layer. For example, various types of automated seamless migration processes can be used, as described elsewhere herein.

6. At the completion of the migration process, when DEV_X and DEV_X' have reached a synchronized state, initiate a switchover from the SCSI device DEV_X to the NVMe device DEV_X'. This switchover illustratively ending the temporary masking of the NVMe protocol endpoints for the NVMe device DEV_X' and disabling and removing the SCSI protocol endpoints for the SCSI device DEV_X.

7. Provide access to the NVMe device DEV_X' via the multi-path layer of the host and the now unmasked NVMe protocol endpoints.

As noted above, the multi-path layer in some embodiments comprises a PowerPathx layer comprising one or more PowerPath® drivers, although other types of MPIO layers having different MPIO drivers can be used. Such a multi-path layer illustratively manages storage of different classes, with the classes differentiated both in terms of storage array vendor and block access protocol.

For example, PowerPath® when configuring a logical storage device learns device information such as standard unique identifier as seen through each path along with other storage information such as storage array serial number, target-port hierarchy, etc. For each class of storage, PowerPath® creates a class object comprising a Loadable Array Module or LAM. This LAM is responsible for the initial discovery and configuration of the logical storage device per its characteristics within the multi-path layer.

In illustrative embodiments, there are separate LAMs managing devices presented through SCSI and NVMe protocol endpoints from the same storage array. For simplicity of illustration, assume there are two LAMs, denoted LAM_SCSI and LAM NVMe, that configure the logical storage devices with SCSI and NVMe access protocols, respectively.

In the present example algorithm, where a logical storage device presents both SCSI and NVMe protocol endpoints, it is assumed that LAM_SCSI configures the SCSI protocol endpoints and associated paths and LAM NVMe configures the NVMe protocol endpoints and associated paths. Using the disclosed techniques, which in the present example algorithm involve managing a single logical storage device seen with two different protocols, a multi-path layer such as PowerPath® can be configured to effectively manage multi-path responsibilities with the two LAMs noted above, namely LAM_SCSI and LAM NVMe, spanning the path sets for each protocol.

The host-side portion of the algorithm in the present example more particularly includes the following steps:

1. Discover new paths through one or more NVMe protocol endpoints to the existing device already managed by LAM_SCSI. The new paths will be configured by LAM NVMe.

2. With the NVMe protocol endpoints presenting the same device identity as the SCSI protocol endpoints, the multi-path layer will configure and manage the new NVMe paths to the same pseudo device.

3. To reduce the impact of changes in access protocol to one or more upper layers of the host device, the multi-path layer masks the NVMe paths, illustratively by not publishing the NVMe protocol endpoints to the one or more upper layers until the transformation is compete. In the present example this transformation involves data migration along with access protocol switchover.

4. By the above-noted masking, the NVMe paths have restricted access to any kind of information exchange between the host and the logical storage device, with the multi-path layer only being able to communicate internally.

5. In embodiments where the storage array does not include functionality to copy the data between different access protocols, such as SCSI and NVMe in the current example, the multi-path layer can be configured to facilitate this data copy through utilization of a host-based copy mechanism, prior to initiation of switchover from the SCSI device DEV_X to the NVMe device DEV_X'.

6. At the completion of the migration, the switchover will enable access to the device through NVMe endpoints with the multi-path layer publishing the NVMe paths to the one or more upper layers.

7. The SCSI device DEV_X will be disabled or otherwise made inaccessible.

In other embodiments where a storage array uses the same storage pool for both SCSI and NVMe devices, the device access protocol transformation need not include any data copying or migration.

In some embodiments, NVMe over Fabric (NVMeoF) is supported through a SCSI-to-NVMe translation layer by which the multi-path layer will be presented with SCSI translated personality for the NVMeOF device and the above example algorithm then facilitates transforming the device access protocol from SCSI to NVMe for existing managed devices, including devices in use by one or more applications executing on the host.

In embodiments with support for an end-to-end NVMe storage stack, if allowing registration of a block device independent of the underlying access protocol, the above example algorithm provides seamless transformation across access protocols.

In embodiments that do not support generic block device registration independent of its access protocol, one or more MPIO drivers or another type of multi-path layer can be configured to facilitate the SCSI-to-NVMe translation within its stack toward this transformation until the point the device is re-configured. After this re-configuration, applications on the host will be presented with NVMe personality.

On other types of platforms, the storage block device is registered independent of its access protocol. The above-described host multi-path layer arrangement can provide support in these and other embodiments in which a storage block device can have multiple access protocols from the storage array.

The multi-path layer portions of the above example algorithm may be performed by an MPIO driver of the host device, and similarly performed by other MPIO drivers on respective other host devices. Such MPIO drivers illustratively form a multi-path layer of the host devices.

The above example algorithm and other processes herein are presented by way of illustrative example only, and other embodiments can utilize additional or alternative steps. Also certain steps illustrated as being performed serially can instead be performed at least in part in parallel with one another.

The process in the above example provides non-disruptive transformation of a logical storage device from utilization of a first access protocol such as a SCSI protocol to utilization of a second access protocol such as an NVMe protocol.

Some embodiments include only a single host device, although multiple host devices are used in illustrative embodiments. For example, a single host device can be connected to two storage arrays that are arranged in an active-active configuration.

Also, it should be noted that the host devices in a given embodiment need not be in an active-active configuration. For example, multiple host devices can be arranged in a cluster and the host devices can be arranged in active-passive configurations, active-active configurations, or combinations thereof.

The particular non-disruptive transformation arrangements described above are presented by way of illustrative example only. Numerous alternative arrangements can be used in other embodiments.

The illustrative embodiments disclosed herein can provide a number of significant advantages relative to conventional arrangements. For example, some embodiments provide non-disruptive transformation of logical storage devices between different access protocols. Such arrangements in illustrative embodiments can alter, in a non-disruptive manner, the particular access protocol through which a given logical storage volume or other logical storage device is accessed by a host device, illustratively from a SCSI access protocol to an NVMe access protocol or vice versa.

Such embodiments overcome the drawbacks of conventional approaches that fail to provide an effective mechanism for transforming a particular logical storage device from utilization of a first access protocol such as a SCSI access protocol to utilization of a second access protocol such as an NVMe access protocol, without unduly disrupting the operation of the storage system.

In some embodiments, the non-disruptive transformation of storage device access protocol is implemented in a multi-path layer that comprises at least one MPIO driver configured to process IO operations of at least one host device that communicates with one or more storage arrays or other types of storage systems.

For example, in some embodiments, a multi-path layer that supports multiple access protocols such as SCSI and NVMe is configured to manage a particular logical storage device so as to provide different sets of paths for both SCSI and NVMe access protocols but with a single device identity, thereby allowing the multi-path layer to non-disruptively transform the particular logical storage device from SCSI to NVMe or vice versa. As the device identity is persistent across this transformation, applications executing on the host device see no impact and the host device can non-disruptively switch the particular logical storage device from utilization of one access protocol to utilization of the other access protocol.

Accordingly, illustrative embodiments can non-disruptively transform storage access protocol for a single logical storage volume or other logical storage device from NVMe to SCSI and vice versa.

Additionally or alternatively, some embodiments provide an MPIO driver or other multi-path layer arrangement supporting more than one storage access protocol for a single managed device.

The disclosed non-disruptive transformation functionality can be implemented using a wide variety of different storage arrays and other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, migration control logic and additional or alternative components. Also, the particular configurations of system and device elements and associated processing operations illustratively shown in the drawings can be varied in other embodiments. For example, a wide variety of different host device, MPIO driver and storage system configurations and associated arrangements for non-disruptive transformation across access protocols can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
    a host device comprising a processor coupled to a memory;
    the host device being configured to communicate over a network with a storage system;
    the host device being further configured:
    to discover one or more first protocol endpoints presented by the storage system for a first logical storage device, the first logical storage device utilizing a first access protocol;
    to discover one or more second protocol endpoints presented by the storage system for a second logical storage device, the second logical storage device utilizing a second access protocol different than the first access protocol;
    responsive to determining that the first and second logical storage devices have a same device identity, to temporarily mask the one or more second protocol endpoints in a multi-path layer of the host device from one or more applications executing on the host device; and
    in conjunction with a switchover from the first logical storage device to the second logical storage device, to end the temporary masking in the multi-path layer and to enable access of the one or more applications to the second logical storage device via the one or more second protocol endpoints.

2. The apparatus of claim 1 wherein the first access protocol comprises a Small Computer System Interface (SCSI) access protocol and the second access protocol comprises a Non-Volatile Memory Express (NVMe) access protocol, and wherein the first logical storage device is configured by the storage system as a SCSI storage device and the second logical storage device is configured by the storage system as an NVMe storage device having the same device identity as the first logical storage device.

3. The apparatus of claim 1 wherein the first and second logical storage devices are part of a same storage pool of a storage array of the storage system.

4. The apparatus of claim 1 wherein the first and second logical storage devices are part of respective first and second different storage pools of at least one storage array of the storage system.

5. The apparatus of claim 4 wherein the first and second logical storage devices are part of respective first and second different storage pools of respective first and second storage arrays of the storage system.

6. The apparatus of claim 4 wherein prior to initiation of the switchover from the first logical storage device to the second logical storage device, data is copied from the first logical storage device in the first storage pool to the second logical storage device in the second storage pool.

7. The apparatus of claim 1 wherein the multi-path layer comprises at least one multi-path input-output driver configured to control delivery of input-output operations from the host device to the storage system over one or more selected paths through the network.

8. The apparatus of claim 1 wherein in conjunction with discovering one or more first protocol endpoints and one or more second protocol endpoints, the host device is further configured:
    to determine a first set of paths for accessing the first logical storage device via the one or more first protocol endpoints; and
    to determine a second set of paths for accessing the second logical storage device via the one or more second protocol endpoints.

9. The apparatus of claim 8 wherein the first and second sets of paths are managed by the multi-path layer utilizing respective first and second class objects implemented as respective first and second loadable array modules.

10. The apparatus of claim 1 wherein temporarily masking the one or more second protocol endpoints in the multi-path layer of the host device from one or more applications executing on the host device comprises interrupting a process for publishing the one or more second protocol endpoints from the multi-path layer to at least a portion of at least one host device layer above the multi-path layer.

11. The apparatus of claim 10 wherein ending the temporary masking in the multi-path layer comprises performing the process for publishing the one or more second protocol endpoints from the multi-path layer to the at least a portion of the at least one host device layer above the multi-path layer.

12. The apparatus of claim 1 wherein the one or more first protocol endpoints presented by the storage system for the first logical storage device are presented via a translation layer of the storage system that translates from a third access protocol to the first access protocol.

13. The apparatus of claim 12 wherein the third access protocol comprises a Non-Volatile Memory Express over Fabric (NVMeoF) access protocol.

14. The apparatus of claim 1 wherein responsive to determining that the first and second logical storage devices have a same device identity the multi-path layer merges the first and second logical storage devices into a single pseudo device for presentation to the one or more applications executing on the host device.

15. A method performed by a host device configured to communicate over a network with a storage system, comprising:
   discovering one or more first protocol endpoints presented by the storage system for a first logical storage device, the first logical storage device utilizing a first access protocol;
   discovering one or more second protocol endpoints presented by the storage system for a second logical storage device, the second logical storage device utilizing a second access protocol different than the first access protocol;
   responsive to determining that the first and second logical storage devices have a same device identity, temporarily masking the one or more second protocol endpoints in a multi-path layer of the host device from one or more applications executing on the host device; and
   in conjunction with a switchover from the first logical storage device to the second logical storage device, ending the temporary masking in the multi-path layer and enabling access of the one or more applications to the second logical storage device via the one or more second protocol endpoints;
   wherein the host device comprises a processor coupled to a memory.

16. The method of claim 15 wherein in conjunction with discovering one or more first protocol endpoints and one or more second protocol endpoints, the host device is further configured:
   to determine a first set of paths for accessing the first logical storage device via the one or more first protocol endpoints; and
   to determine a second set of paths for accessing the second logical storage device via the one or more second protocol endpoints.

17. The method of claim 15 wherein temporarily masking the one or more second protocol endpoints in the multi-path layer of the host device from one or more applications executing on the host device comprises interrupting a process for publishing the one or more second protocol endpoints from the multi-path layer to at least a portion of at least one host device layer above the multi-path layer.

18. A computer program product comprising a non-transitory processor-readable storage medium having stored therein program code of one or more software programs, wherein the program code, when executed by a host device comprising a processor coupled to a memory and configured to communicate over a network with a storage system, causes the host device:
   to discover one or more first protocol endpoints presented by the storage system for a first logical storage device, the first logical storage device utilizing a first access protocol;
   to discover one or more second protocol endpoints presented by the storage system for a second logical storage device, the second logical storage device utilizing a second access protocol different than the first access protocol;
   responsive to determining that the first and second logical storage devices have a same device identity, to temporarily mask the one or more second protocol endpoints in a multi-path layer of the host device from one or more applications executing on the host device; and
   in conjunction with a switchover from the first logical storage device to the second logical storage device, to end the temporary masking in the multi-path layer and to enable access of the one or more applications to the second logical storage device via the one or more second protocol endpoints.

19. The computer program product of claim 18 wherein in conjunction with discovering one or more first protocol endpoints and one or more second protocol endpoints, the host device is further configured:
   to determine a first set of paths for accessing the first logical storage device via the one or more first protocol endpoints; and
   to determine a second set of paths for accessing the second logical storage device via the one or more second protocol endpoints.

20. The computer program product of claim 18 wherein temporarily masking the one or more second protocol endpoints in the multi-path layer of the host device from one or more applications executing on the host device comprises interrupting a process for publishing the one or more second protocol endpoints from the multi-path layer to at least a portion of at least one host device layer above the multi-path layer.

* * * * *